(12) United States Patent
Noualy

(10) Patent No.: US 6,840,730 B2
(45) Date of Patent: Jan. 11, 2005

(54) BALE MOVING APPARATUS

(76) Inventor: Emmanuel P. Noualy, Box 235, Vulcan, Alberta (CA), T0I 2B0

( * ) Notice: Subject to any disclaimer, the term of this patent is extended or adjusted under 35 U.S.C. 154(b) by 189 days.

(21) Appl. No.: 10/355,589

(22) Filed: Jan. 30, 2003

(65) Prior Publication Data
US 2003/0123956 A1 Jul. 3, 2003

Related U.S. Application Data

(63) Continuation-in-part of application No. 09/909,327, filed on Jul. 18, 2001, now abandoned, which is a continuation-in-part of application No. 09/488,968, filed on Jan. 21, 2000, now abandoned.

(51) Int. Cl.$^7$ .................................................. B60P 1/04
(52) U.S. Cl. ..................... 414/24.6; 414/24.5; 414/485; 414/703
(58) Field of Search ................ 414/24.5, 24.6, 414/482, 483, 484, 485, 703, 721, 911, 912

(56) References Cited

U.S. PATENT DOCUMENTS

| 3,935,954 | A | * | 2/1976 | Woods et al. ............... 414/24.5 |
| 4,215,963 | A | * | 8/1980 | Doner ........................ 414/24.5 |
| 4,348,143 | A | | 9/1982 | Hedgespeth |
| 4,527,935 | A | * | 7/1985 | Fortenberry ............... 414/24.5 |
| 5,178,505 | A | | 1/1993 | Smith |
| 5,603,597 | A | | 2/1997 | Clay, Sr. |
| 5,664,924 | A | | 9/1997 | Barker |
| 5,833,424 | A | | 11/1998 | Bales |
| 6,305,894 | B1 | * | 10/2001 | Dearborn .................... 414/24.5 |

FOREIGN PATENT DOCUMENTS

GB          2203119 A    * 10/1988    .................... 87/12

* cited by examiner

Primary Examiner—Janice L. Krizek
(74) Attorney, Agent, or Firm—Gene Scott Patent Law & Venture Group

(57) ABSTRACT

A bale moving apparatus provides a generally horizontal tow frame with a linear support axle supported by a pair of opposing wheels. A tow bar provides a tow strut, a rest bar, and a winch. A bale support is pivotally joined to, and extends upwardly from the support axle assembly, and is rotatable between an upright attitude and a tilted-back attitude for securing a hay bail. A triangle formation of bale impaling spikes in mutually parallel disposition are used for impaling a hay bale at center and on two sides for securing the bail. The bale is pulling into the tilted-back attitude so as to enable resting the hay bale on the bale rest surface during travel. The rest surface is movable so as to enable placement of the hay bale's center of gravity on the vehicle.

19 Claims, 5 Drawing Sheets

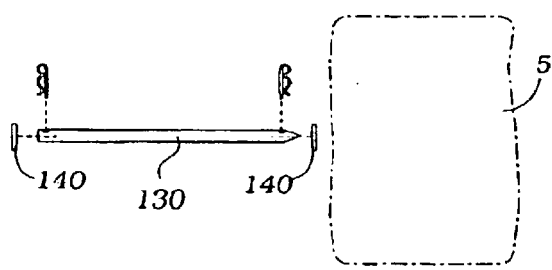
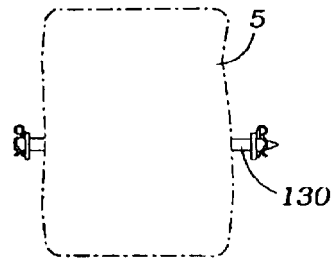
Fig. 7  Fig. 8
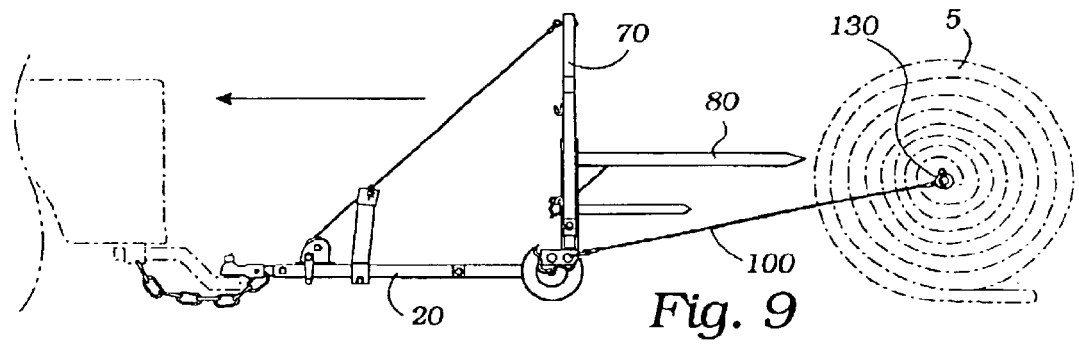
Fig. 9
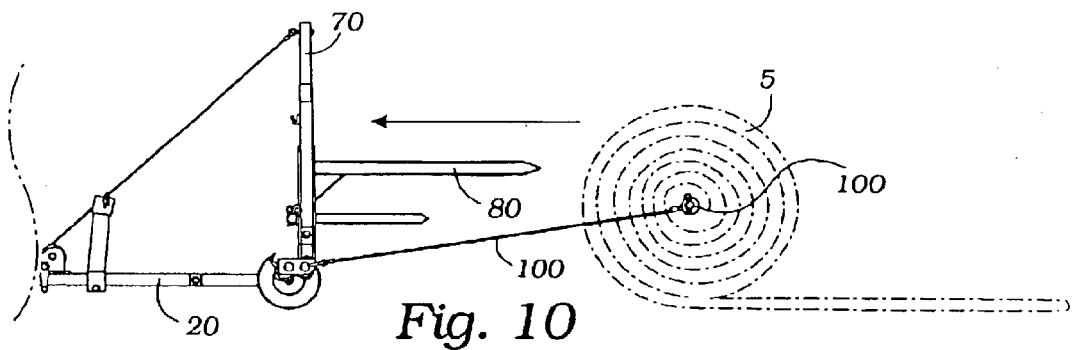
Fig. 10

BALE MOVING APPARATUS

RELATED APPLICATIONS

This is a continuation-in-part application of a prior filed application having Ser. No. 09/909,327 and file date of Jul. 18, 2001, now abandoned which is a continuation-in-part of now abandoned application Ser. No. 09/488,968 filed on Jan. 21, 2000.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to farm equipment drawn by a separate vehicle, and more particularly to a trailer for lifting, moving, handling, and unrolling bales of feed or bedding, especially those of circular conformation.

2. Description of Related Art

The following art defines the present state of this field:

Hedgespeth, U.S. Pat. No. 4,348,148 describes a large round hay bale trailer having a fork lift cradle pivotally mounted on a two wheel trailer frame, the cradle being formed by pipe having a 90 degree vertical and horizontal bends to provide fork, back support and horizontal connecting elements. Laterally extending pipe sections welded to the cradle pipe provide pivotal bearings for a horizontal wheel axle pipe to which trailer frame elements are also secured.

Smith, U.S. Pat. No. 5,178,505 describes an attachment for the three-point hitch of a farm tractor including a generally vertically disposed, inverted U-shaped frame having outwardly extending lower ends connected to a pair of lower lift arms forming part of the three-point hitch of the tractor. The top portion of the frame is pivotally and longitudinally adjustably connected to a telescopically adjustable stabilizer link or bar having its forward end pivotally connected to the usual attachment point of the stabilizer link of a three-point hitch assembly provided on a farm tractor. The outer end of the stabilizer bar includes a transverse sleeve by which various devices including a round hay bale moving device can be pivotally attached. The upper surface of the longitudinally movable component of the telescopic stabilizer bar is provided with a rigid lug to which a hydraulic ram can be pivotally connected with the other end of the hydraulic ram being connected pivotally to the hay moving device or other device attached to the outer end of the stabilizer bar.

Clay, Sr., U.S. Pat. No. 5,603,597 describes a one man round hay bale lifter and transport device for quick assembly and disassembly to a conventional trailer hitch mounted on a pick-up truck. The lifting and transport device includes an anchoring structure and a hay bale lifting and holding structure pivotally mounted on the anchoring structure. The rearward end of the anchoring structure includes a square tube for quick assembly with the square tube of the conventional trailer hitch. A ratchet binder is pivotally mounted on the anchoring structure at one end and on the hay bale lifting structure on the other end. By manually rotating the ratchet handle mounted on a threaded sleeve of the ratchet binder, the lifting structure is elevatable to a maximum angle of about 45. degree with respect to the anchoring structure. A stop bar engages an edge of the anchoring structure to limit further elevation or lowering of the lifting structure. The lifting structure includes at its front end a pronged fork assembly for engaging and lifting the hay bale upon elevation of the lifting structure. Once a hay bale is elevated, the truck is driven to transport the hay bale to a desired location where the operation is reversed to drop off the transported hay bale.

Barker, U.S. Pat. No. 5,664,924 describes a new Round Bale Handling System offering a simple inexpensive device for lifting and unrolling round bales. The inventive device includes a frame, a lifting shaft, two tow chains, and a roll shaft. In use, the farm tractor 4 is backed up and the lifting shaft 30 is forced longitudinally axially into a round bale 2. The farm tractor's hitch is then used to lift the round bale 2 and the round bale 2 can be hauled by the farm tractor 4 to any desired location. When the round bale 2 has been placed, the farm tractor 4 is then relocated around and backed up to the round bale 2 so that the farm tractor 4 is normal to a rolling axis of the round bale 2. The roll shaft 50 is then pushed through the round bale 2 along its rolling axis and the tow chain 40 is rotatably attached to the roll shaft 50 by use of the retaining pin 56 and the hair clip pin 58. The farm tractor 4 then pulls the roll shaft 50 and the round bale 2 rotates about the roll shaft 50 and unrolls as it does so.

Bales, U.S. Pat. No. 5,833,424 describes a hand operated hay bale lifter having a size and weight that can be handled by one person and including a square coupling bar that can be quickly and easily inserted into the receiver pocket of a standard tow bar trailer hitch. Mechanical lifting force produced by a hydraulic jack assembly is transferred to a fork assembly through a contact coupling provided by an open bearing cup or socket mounted on the fork assembly. The hydraulic jack assembly includes a hand pump, a hydraulic power cylinder and a piston rod mounted on an outboard support stub. The bearing cup or socket rotates in sliding engagement against the piston rod during extension and retraction. Because the piston rod and fork assembly are coupled by contact engagement only, the fork assembly can be quickly elevated by hand and locked in an upright travel/storage position.

The prior art teaches the moving of hay bales by means of piercing the bales with spikes and then rotating the bales into a preferred attitude for transport. However, the prior art does not teach an advantageous positioning of a rest surface so that the CG of a lifted and transported bale is advantageously placed. The present invention fulfills these needs and provides further related advantages as described in the following summary.

SUMMARY OF THE INVENTION

The present invention provides an improved bale moving apparatus including a generally horizontal tow frame with a linear support axle supported by a pair of opposing wheels. A tow bar provides a tow strut, a rest bar, and a winch. A bale support is pivotally joined to, and extends upwardly from the support axle assembly, and is rotatable between an upright attitude and a tilted-back attitude for securing a hay bale. A triangle formation of bale impaling spikes in mutually parallel disposition are used for impaling a hay bale at center and on two sides for securing the bale. The bale is pulling into the tilted-back attitude so as to enable resting the hay bale on the bale rest surface during travel. The rest surface is movable so as to enable placement of the hay bale's center of gravity on the vehicle.

A primary objective of the present invention is to provide a hay bale moving trailer apparatus having advantages not taught by the prior art.

A further objective is to provide such an apparatus that is able to move bales and then unroll them so that they may be used to feed livestock.

A further objective is to provide a such an apparatus enabled for tipping a bale onto its side.

A further objective is to provide such an apparatus that can handle round bales of different diameters, with different center heights.

A further objective is to provide such an apparatus wherein the center of gravity of the lifted bale may be selectively placed relative to the transporting vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIGS. 7 and 8 are elevational views of a spike of the invention showing the manner in which the spike is inserted into a hay bale;

FIGS. 9 and 10 are elevational views showing the manner in which the invention is used to unroll a hay bale.

DETAILED DESCRIPTION OF THE INVENTION

Figure 1:
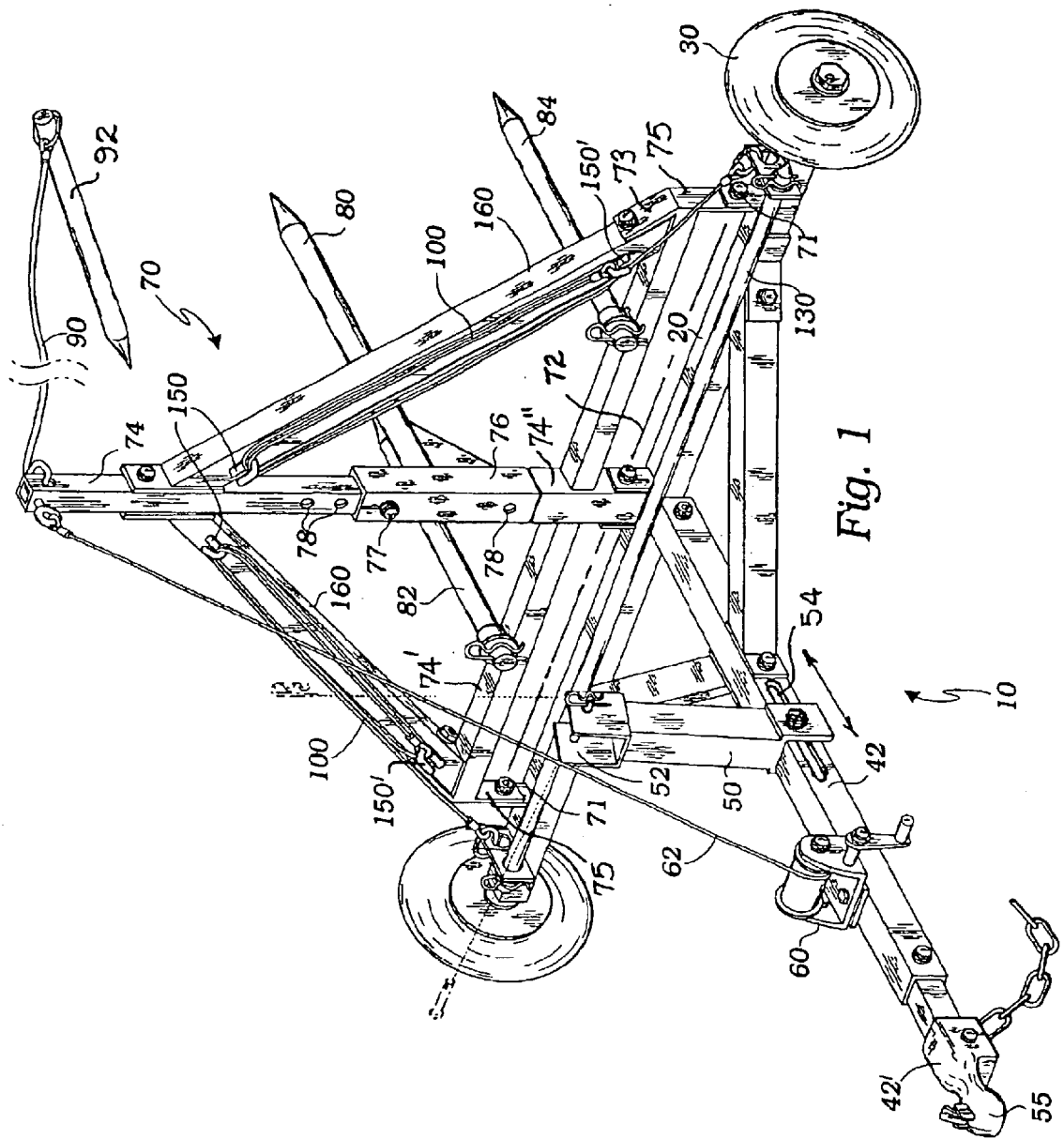
FIG. 1 is a perspective view of the preferred embodiment of the present invention.

The above described drawing figures illustrate the invention, a bale moving apparatus comprising a generally horizontal tow frame 10 providing a linear support axle assembly 20 supported by a pair of opposing wheels 30 for moving the tow frame 10 over a terrain surface (not shown). Such a support axle assembly 20 may use any well-known automotive type axle assemblies type. Medially joined with the support axle assembly 20 is a tow bar assembly, providing a tow strut 42 which is preferably of square steel tubing and is welded or bolted to the support axle assembly 20, a medially placed rest bar 50 extending upwardly from the tow strut 42 and of similar construction, a winching means 60, preferably a hand crank, as shown in FIG. 1, or a motor driven winch (not shown), and a distal tow fixture 55 such as any such fixture commonly used for towing trailers and such. The described elements of this assembly are joined together using well-known fasteners and fastening techniques.

Figure 2:
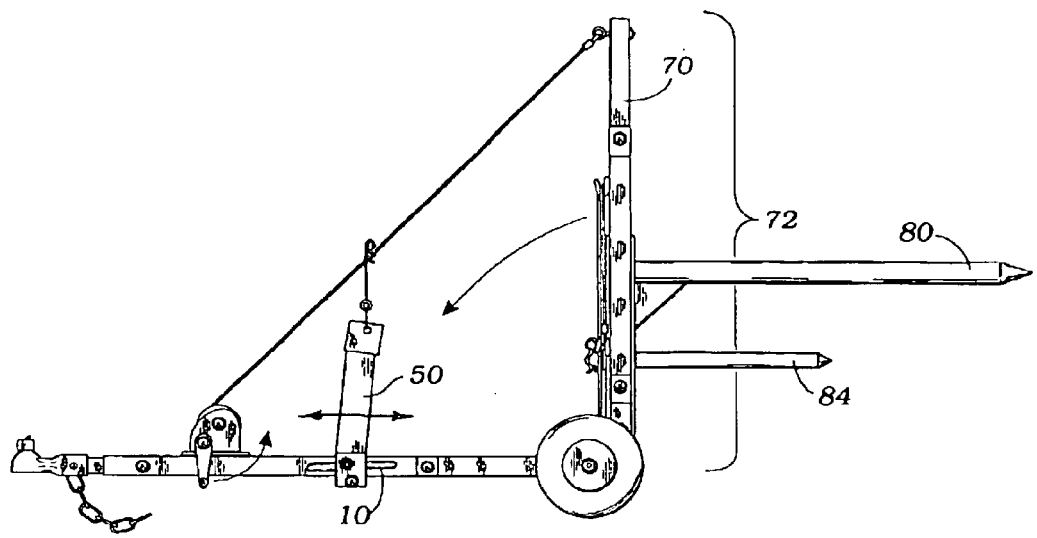
FIG. 2 is a side elevational view thereof showing a bale support assembly of the invention in a preferred vertical attitude for piercing a bale.
Figure 3:
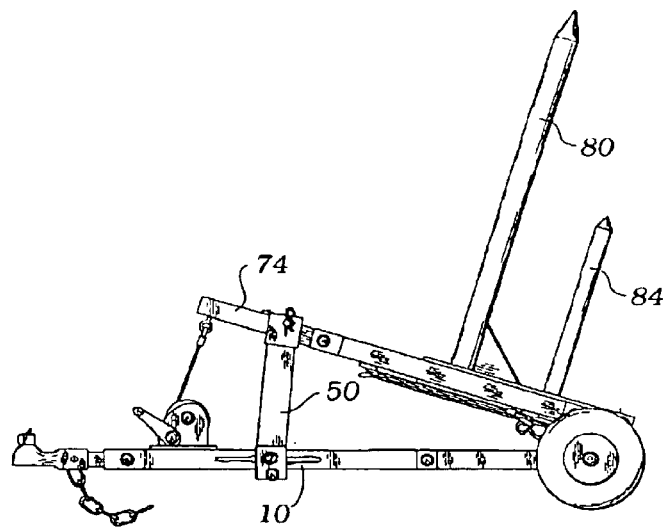
FIG. 3 is a side elevational view thereof showing the bale support assembly of the invention in a preferred tilted-back attitude for transporting the bale.
Figure 4:
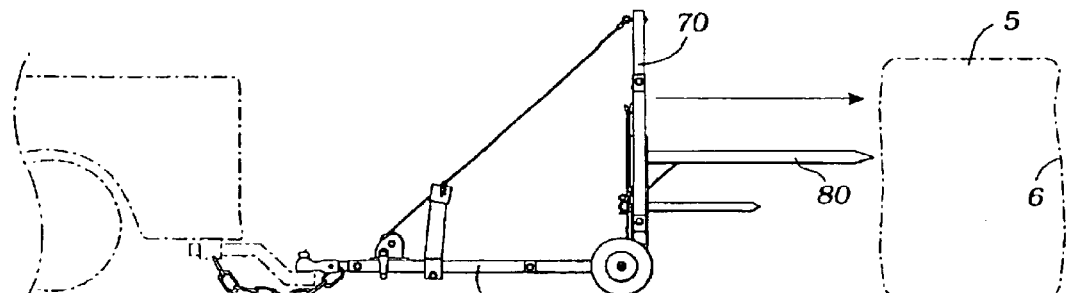
FIGS. 4 and 5 are similar to FIG. 2 showing the invention as it approaches and impales a bale.
Figure 5:
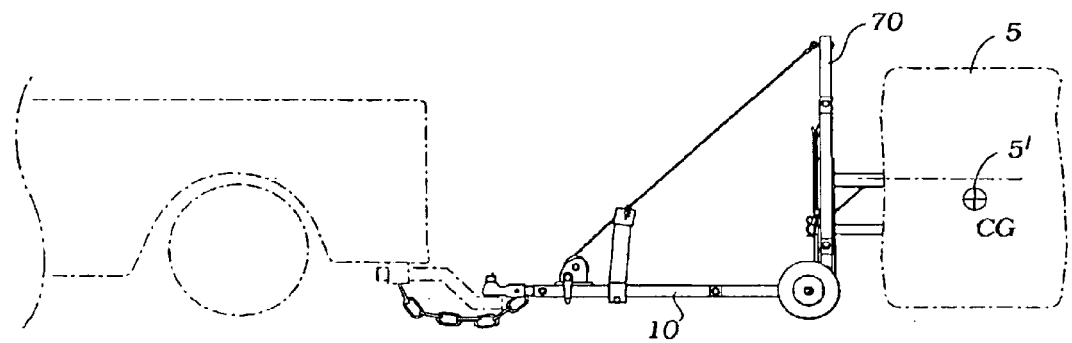
Figure 6:
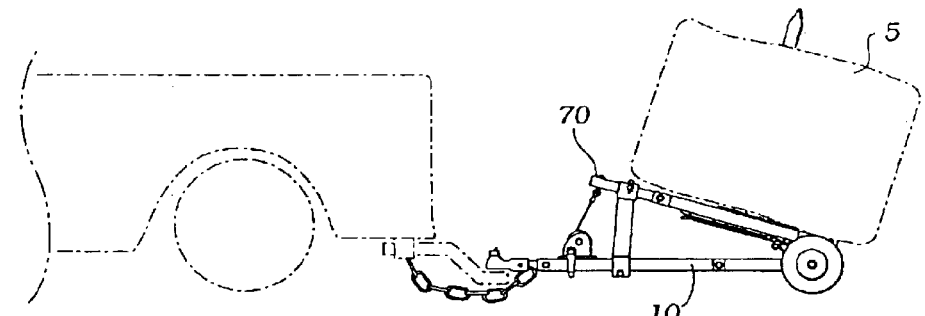
FIG. 6 is similar to FIG. 3 showing the manner in which a bale is transported.
Figure 11:
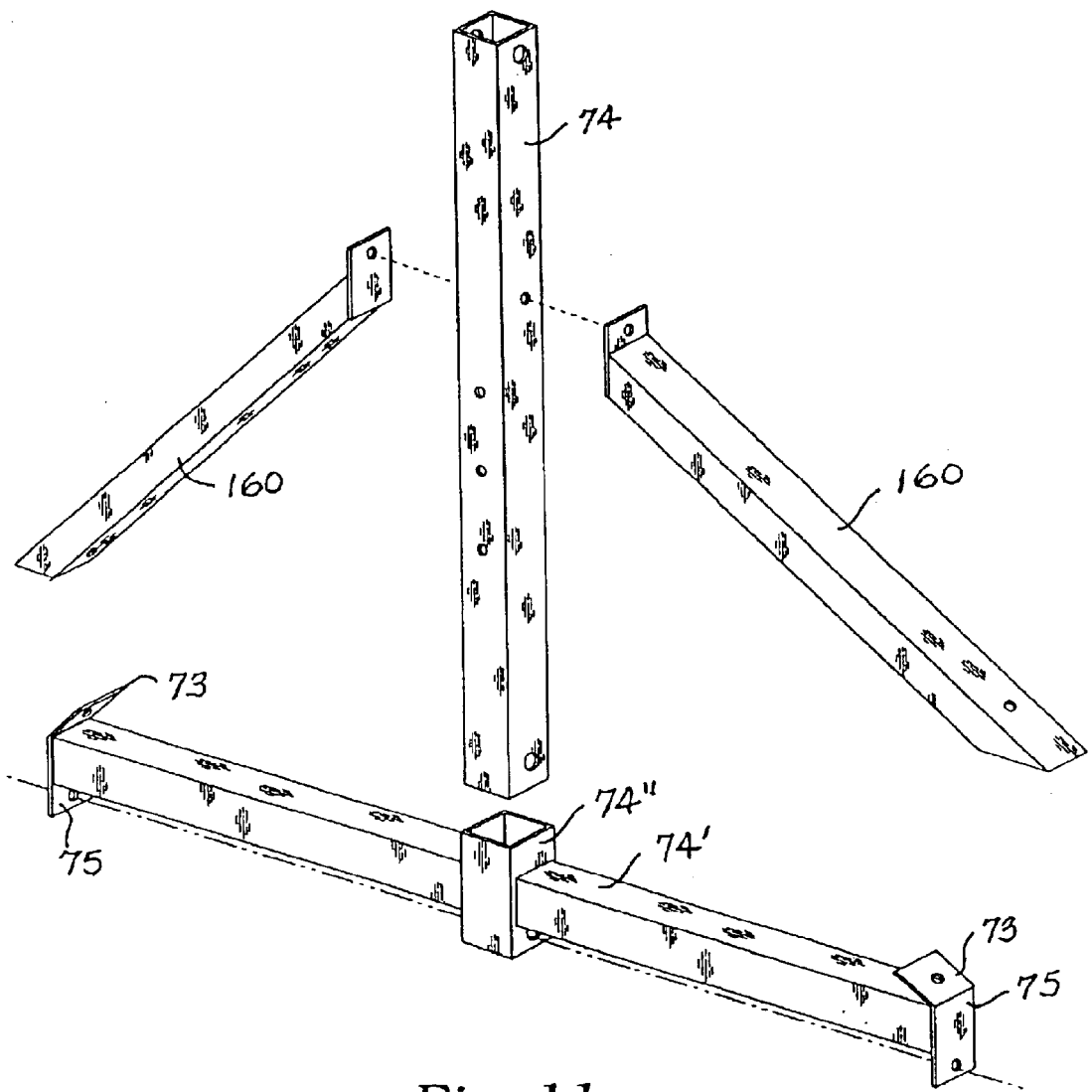
FIG. 11 is an exploded view of the structural elements of the bale lifting portion of the invention.

A bale support assembly 70 is pivotally joined to, and extends upwardly from the support axle assembly 20. The bale support assembly 70, including a bale rest surface 72, is tilted back by rotating it about pivot bolts 71, between an upright attitude, as shown in FIG. 2, and a tilted-back attitude, preferably at an angle of between 30 and 45 degrees with respect to the horizontal, as shown in FIG. 3, such that it is able to rest on the rest bar 50. Extending normally from the rest surface 72 is a triangle formation of bale impaling spikes in mutually parallel disposition, such that with the bale support assembly 70 positioned in the upright attitude, a main bale impaling spike 80 is in position for impaling a hay bale 5, preferably above its center of gravity (CG) 5' (FIG. 5), and two lateral bale impaling spikes 82 and 84 are in position for impaling the hay bale 5 below the spike 80 and the CG 5', and are in spaced apart lateral positions as shown in FIG. 1.

The winching means 60 is joined with the bale support assembly 70 by a winching cable 62 and is enabled by its tensile strength for pulling the bale support assembly 70 into the tilted-back attitude so as to enable resting the hay bale 5 on the bale rest surface 72 during travel. When the bale 5 has arrived at a desired location, gravity assists in lowering the bale 5 to the ground such that it assumes its original orientation relative to the ground.

Inventively, the rest bar 50 provides a U-shaped receiver 52 for accepting an upright bar 74 of the bale support assembly 70, and further provides a means for locking the upright bar 74 into the U-shaped receiver 52. Preferably, the locking means is a combination dowel pin and cotter pin 54.

Inventively, the apparatus further includes a pull-line 90 which extends to and terminates at a pull-line spike 92 which may be inserted into a bale 5. When the apparatus is pulled forward by the towing vehicle 170, the pull line 90 and the pull line spike 92 are of such size and dimension so as to enable the tipping-over of the bale 5 when the pull line spike 92 is inserted into the distal side 6 of the bale 5.

Inventively, the apparatus further provides a means for unrolling a hay bale, as shown in FIGS. 7, 8, 9, and 10. Two cables 100 are attached to the sides of the support axle assembly 20, as shown in FIGS. 9 and 10. At their opposite end, the cables 100 are attached to an unrolling bar 130 by means of tow fixtures (common hardware). The unrolling bar 130 is a spike of such configuration as to be easily pressed through the bale 5 at its center. The unrolling bar 130 is put through the center of the bale 5 parallel with the ground, as shown in FIGS. 7, 8, and 9. When the towing vehicle 170 is driven forward, the cables 100 are pulled taut and they in turn pull the unrolling bar 130 in a forward direction, as indicated by the arrows in FIGS. 9 and 10. The unrolling bar 130 urges and pulls the bale 5 so that it unrolls behind the apparatus. Round washers 140 are placed near the ends of the unrolling bar 130 and held in place with cotter pins, as shown in FIGS. 7 and 8. This prevents the unrolling bar 130 from moving laterally with respect to the bale 5.

Inventively, the apparatus further provides an unrolling means receiving means adapted for storing the unrolling means. When each of the cables 100 are not in use, they are looped around hooks 150 and 150' attached to support bars 160, such support bars 160 and forming a part of the bale support assembly 70. Each of the support bars 160 preferably forms an angle of approximately 45 degrees with the horizontal.

Inventively, the apparatus further provides a means for vertically positionally adjusting the spike 80 along the upright bar 74 so as to correspond to a range of bale diameters. The vertical positioning of the spike 80 is accomplished by moving sleeve 76, to which the spike 80 is attached, vertically and setting it in a desired vertical position by pinning through aligned holes 77 in the sleeve 76, and in the upright bar 74 (holes 78).

In another embodiment of the present invention the bale moving apparatus may be described a comprising in combination, a hay bale 5 selected from a plurality of hay bales wherein the plurality of hay bales have an average height and a tow frame providing an axle 20 supported by a pair of opposing wheels 30. Medially joined with, and extending from the axle 20 is a tow strut 10 providing; a medially placed rest bar 50 extending upwardly therefrom, a winch 60, and a distal tow fixture 55. A bale support 70 is pivotal about a pivot axis 72, and is joined to, and extending upwardly from, the axle 20, the bale support 70 rotatable between the upright attitude and the tilted-back attitude where it is engaged with the rest bar 50. Extending from the bale support 70 are a triangle formation of three bale impaling spikes 80, 82 and 84 positioned approximately parallel with a ground surface when the bale support 70 is in the upright attitude. The pivot axis 72 is positioned at a height above the ground surface approximately equal to ⅓ of the average height of the hay bales 5 and wherein the tow strut 10 provides a means for longitudinal positioning 54 of the rest bar 50 and this is preferably a pair of opposing slots in the tow strut 10, as shown in FIG. 1. Thus, with the bale support 70 in the tilted-back attitude, the center of gravity 5' of the hay bale 5 is positionable relative to the pivot axis 72. This is valuable in selecting how much of the bail's load is to be placed onto the rest bar 50 and how much self-righting weight is to be enabled.

Preferably, one 80 of the three bale impaling spikes is directed in line with the tow strut 10 and is positioned centrally on the hay bale 5, with the further two bale impaling spikes 82, 84 positioned equidistantly and laterally to the one 80 of the three bale impaling spikes. This arrangement provides for stability in engaging, lifting and lowering the bale.

Preferably, the bale support 70 comprises: a lower support 74' of tubing providing a medial receiver 74" and proximal and distal end caps 75, the end caps 75 providing mutually converging angled ears 73. The upright bar 74 is fastened within the medial receiver 74" and extends upwardly therefrom. A pair of side trusses 160 (support bars) are positioned on either side of the upright bar 74 and fastened between the angled ears 73 of the end caps 75 and the upright bar 74. The lower support 74' with its medial receiver 74" and end caps 75, as an integral weldment, and the upright bar 74 and the pair of side trusses or support bars 160, form an assembly that is easy to pack and ship, easy to assemble and mount onto a tow strut 10 and provides other advantages in strength and ease of use. As shown, the several elements defined above are attached using welding and assembled using common fastener hardware.

Preferably, the distance between either of the further two 82, 84 of the three bale impaling spikes and the one 80 of the three bale impaling spikes is less than the distance between the further two of the three bale impaling spikes. This insures that the center of gravity of the bale is positioned within the triangle formed by the impaling spikes. Preferably, the one 80 of the three bale impaling spikes is positioned at the center of the hay bale 5 for improved stability in lifting.

As previously described, the moving sleeve 76 is adapted for sliding on the upright bar 74 and for engaging the one 80 of the three bale impaling spikes for vertical positioning thereof and wherein the further two 82 and 84 of the three bale impaling spikes are disengagable from the bale support 70 so as to be used for tipping and righting hay bales 5.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A bale moving apparatus comprising in combination:
   a hay bale selected from a plurality of hay bales wherein the plurality of hay bales have an average height;
   a tow frame providing an axle supported by a pair of opposing wheels;
   medially joined with, and extending from the axle, a tow strut providing:
   a medially placed rest bar extending upwardly therefrom,
   a winch, and
   a distal tow fixture;
   a bale support pivotal about a pivot axis, joined to, and extending upwardly from the axle, the bale support rotatable between an upright attitude and a tilted-back attitude engaged with the rest bar;
   extending from the bale support, a triangle formation of three bale impaling spikes positioned approximately parallel with a ground surface when the bale support is in the upright attitude;
   the pivot axis positioned at a height above the ground surface approximately equal to ⅓ of the average height of the hay bales and wherein the tow strut provides means for longitudinally positioning of the rest bar thereon, whereby, with the bale support in the tilted-back attitude, the center of gravity of the hay bale is positionable relative to the pivot axis.

2. The apparatus of claim 1 wherein one of the three bale impaling spikes is directed in line with the tow strut and centrally on the hay bale, and the further two bale impaling spikes are positioned equidistantly laterally to the one of the three bale impaling spikes.

3. The apparatus of claim 1 wherein the winch is a hand crank.

4. The apparatus of claim 1 further comprising a pull-line fastened to the apparatus and terminating with a pull-line spike, the pull-line and the pull-line spike of such size and dimension for enabling the righting of the hay bale.

5. The apparatus of claim 1 further comprising a means for unrolling the hay bale and an unrolling means receiving means adapted for storing the unrolling means.

6. The apparatus of claim 1 wherein the distance between either of the further two of the three bale impaling spikes and the one of the three bale impaling spikes is less than the distance between the further two of the three bale impaling spikes.

7. The apparatus of claim 1 wherein the one of the three bale impaling spikes is positioned at the center of the hay bale.

8. The apparatus of claim 1 wherein the average height of the plurality of hay bales is between 4 and 6 feet.

9. The apparatus of claim 1 wherein the bale support comprises: a lower support of tubing providing a medial receiver and proximal and distal end caps, the end caps providing mutually converging angled ears; an upright bar fastened within the medial receiver and extending upwardly therefrom; and a pair of side trusses positioned on either side of the upright bar and fastened between the angled ears of the end caps and the upright bar.

10. The apparatus of claim 9 wherein the rest bar provides a U-shaped receiver for accepting the upright bar of the bale support, and further provides a means for locking the upright bar into the U-shaped receiver.

11. The apparatus of claim 10 wherein the locking means is a dowel pin fastened in place by a cotter pin.

12. The apparatus of claim 9 further comprising a moving sleeve adapted for sliding on the upright bar and for engaging the one of the three bale impaling spikes for vertical positioning thereof and wherein the further two of the three bale impaling spikes are disengagable from the bale support.

13. A bale moving apparatus comprising in combination:
a hay bale selected from a plurality of hay bales wherein the plurality of hay bales have an average height;
a tow frame providing an axle supported by a pair of opposing wheels;
medially joined with, and extending from the axle, a tow strut providing:
a medially placed rest bar extending upwardly therefrom,
a winch, and
a distal tow fixture;
a bale support pivotal about a pivot axis, joined to, and extending upwardly from the axle, the bale support rotatable between an upright attitude and a tilted-back attitude engaged with the rest bar;
extending from the bale support, a triangle formation of three bale impaling spikes positioned approximately parallel with a ground surface when the bale support is in the upright attitude, wherein the distance between two laterally positioned ones of the spikes is greater than the distance between either one of the two laterally positioned ones of the spikes and a medially placed one of the spikes;
the pivot axis positioned at a height above the ground surface approximately equal to ⅓ of the average height of the hay bales and wherein the tow strut provides means for longitudinal positioning of the rest bar thereon, whereby, with the bale support in the tilted-back attitude, the center of gravity of the hay bale is positionable relative to the pivot axis.

14. The apparatus of claim 13 wherein the winch is a hand crank.

15. The apparatus of claim 13 wherein the rest bar provides a U-shaped receiver for accepting the upright bar of the bale support, and further provides a means for locking the upright bar into the U-shaped receiver.

16. The apparatus of claim 13 further comprising a pull-line fastened to the apparatus and terminating with a pull-line spike, the pull-line and the pull-line spike of such size and dimension for enabling the righting of the hay bale.

17. The apparatus of claim 13 further comprising a means for unrolling the hay bale and an unrolling means receiving means adapted for storing the unrolling means.

18. The apparatus of claim 13 wherein the bale support comprises: a lower support of tubing providing a medial receiver and proximal and distal end caps, the end caps providing mutually converging angled ears; an upright bar fastened within the medial receiver and extending upwardly therefrom; and a pair of side trusses positioned on either side of the upright bar and fastened between the angled ears of the end caps and the upright bar.

19. The apparatus of claim 18 further comprising a moving sleeve adapted for sliding on the upright bar and for engaging the medially placed one of the three bale impaling spikes for vertical positioning thereof and wherein the further two of the three bale impaling spikes are disengagable from the bale support.

* * * * *